United States Patent
Vagnati

(10) Patent No.: US 9,693,106 B2
(45) Date of Patent: Jun. 27, 2017

(54) METHOD AND SYSTEM FOR PREORDERING CONTENT IN A USER DEVICE ASSOCIATED WITH A CONTENT PROCESSING SYSTEM

(75) Inventor: Michelle L. Vagnati, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 597 days.

(21) Appl. No.: 11/828,490

(22) Filed: Jul. 26, 2007

(65) Prior Publication Data

US 2009/0031345 A1 Jan. 29, 2009

(51) Int. Cl.
*G06F 3/00* (2006.01)
*G06F 13/00* (2006.01)
(Continued)

(52) U.S. Cl.
CPC ... *H04N 21/47214* (2013.01); *H04N 7/17318* (2013.01); *H04N 21/26283* (2013.01);
(Continued)

(58) Field of Classification Search
CPC .. H04N 5/44543; H04N 21/482; H04N 21/84; H04N 21/4821; H04N 21/4345;
(Continued)

(56) References Cited

U.S. PATENT DOCUMENTS 5,920,700 A 7/1999 Gordon et al.
5,974,567 A 10/1999 Dickson et al.
(Continued)

FOREIGN PATENT DOCUMENTS

EP 0691787 A1 1/1996
JP 2003319271 11/2003
(Continued)

OTHER PUBLICATIONS

International Search Report and Written Opinion dated Oct. 28, 2008 in International Application No. PCT/US2008/070972 filed Jul. 24, 2008 by Michelle L. Vagnati.
(Continued)

*Primary Examiner* — Ngoc Vu
(74) *Attorney, Agent, or Firm* — Harness, Dickey & Pierce, PLC

(57) ABSTRACT

A system and method for preordering content includes a content processing system and a user device in communication with the content processing system. The content processing system receives program guide data for linear channels and receives future available content data at the user device. The future available content data comprises an availability window having an availability start time and an availability end time. The user device stores the program guide data in the user device storing the future available content data in a memory of the user device, forms a future content selection, and stores the future content selection in a queue until the availability window is reached. When within the availability window, the user device communicates a material identification to the content processing system. The content processing system communicates the content corresponding to the material identification to the user device.

18 Claims, 10 Drawing Sheets

(51) Int. Cl.
  *H04N 5/455* (2006.01)
  *H04N 21/472* (2011.01)
  *H04N 7/173* (2011.01)
  *H04N 21/262* (2011.01)
  *H04N 21/658* (2011.01)
  *H04N 21/482* (2011.01)
  *H04N 21/61* (2011.01)

(52) U.S. Cl.
  CPC ....... *H04N 21/482* (2013.01); *H04N 21/6143* (2013.01); *H04N 21/6581* (2013.01)

(58) Field of Classification Search
  CPC ............. H04N 21/47214; H04N 5/782; H04N 21/4334; H04N 7/17318; H04N 21/23406; H04N 21/47202; H04N 21/6587; H04N 7/17336; H04N 2005/44547; H04N 2005/44556; H04N 2005/44565; H04N 21/2225; H04N 21/231; H04N 21/232; H04N 21/262; H04N 21/26291; H04N 21/40
  USPC ....................................... 725/39, 55, 58, 104
  See application file for complete search history.

(56) References Cited

U.S. PATENT DOCUMENTS

| | | |
|---|---|---|
| 6,005,565 A | 12/1999 | Legall et al. |
| 6,057,890 A | 5/2000 | Virden et al. |
| 6,199,049 B1 | 3/2001 | Conde et al. |
| 6,212,327 B1 | 4/2001 | Berstis et al. |
| 6,515,680 B1 | 2/2003 | Hendricks et al. |
| 6,564,996 B2 | 5/2003 | Hoffman et al. |
| 6,681,395 B1 | 1/2004 | Nishi |
| 6,714,722 B1* | 3/2004 | Tsukidate ........................ 386/83 |
| 6,802,077 B1 | 10/2004 | Schlarb |
| 6,813,711 B1 | 11/2004 | Dimenstein |
| 6,820,277 B1 | 11/2004 | Eldering et al. |
| 6,922,845 B2 | 7/2005 | Yap et al. |
| 6,934,916 B1 | 8/2005 | Webb et al. |
| 6,968,364 B1 | 11/2005 | Wong et al. |
| 6,973,669 B2 | 12/2005 | Daniels |
| 7,027,716 B1 | 4/2006 | Boyle et al. |
| 7,051,277 B2 | 5/2006 | Kephart et al. |
| 7,055,165 B2 | 5/2006 | Connelly |
| 7,131,069 B1 | 10/2006 | Rush et al. |
| 7,240,358 B2 | 7/2007 | Horn et al. |
| 7,373,652 B1 | 5/2008 | Bayrakeri et al. |
| 7,543,325 B2 | 6/2009 | Westbrook et al. |
| 7,600,064 B2 | 10/2009 | Knowles et al. |
| 7,730,146 B1 | 6/2010 | Mace et al. |
| 7,788,701 B1 | 8/2010 | Lavin |
| 7,818,368 B2 | 10/2010 | Yang et al. |
| 7,992,179 B1 | 8/2011 | Kapner et al. |
| 8,005,419 B2 | 8/2011 | Patsiokas et al. |
| 2002/0031097 A1 | 3/2002 | Jung |
| 2002/0032905 A1 | 3/2002 | Sherr et al. |
| 2002/0107802 A1 | 8/2002 | Philips |
| 2002/0129217 A1 | 9/2002 | Nichols |
| 2002/0143976 A1 | 10/2002 | Barker et al. |
| 2002/0144260 A1 | 10/2002 | Devara |
| 2002/0150387 A1 | 10/2002 | Kunii et al. |
| 2002/0166121 A1 | 11/2002 | Rovira |
| 2003/0005435 A1 | 1/2003 | Nelger et al. |
| 2003/0009758 A1 | 1/2003 | Townsend et al. |
| 2003/0009770 A1 | 1/2003 | Tantawy et al. |
| 2003/0030751 A1 | 2/2003 | Lupulescu et al. |
| 2003/0084449 A1 | 5/2003 | Chane et al. |
| 2003/0095791 A1 | 5/2003 | Barton et al. |
| 2003/0101456 A1* | 5/2003 | Park et al. .................... 725/55 |
| 2003/0135495 A1 | 7/2003 | Vagnozzi |
| 2003/0193519 A1 | 10/2003 | Hayes et al. |
| 2003/0206719 A1 | 11/2003 | Bumgardner et al. |
| 2003/0208763 A1 | 11/2003 | McElhatten et al. |
| 2003/0220100 A1* | 11/2003 | McElhatten .......... G06F 3/0482 455/418 |
| 2003/0221127 A1 | 11/2003 | Risan et al. |
| 2003/0221194 A1 | 11/2003 | Thiagarajan et al. |
| 2003/0223734 A1 | 12/2003 | Cooper, Jr. |
| 2004/0025185 A1 | 2/2004 | Goci et al. |
| 2004/0040041 A1 | 2/2004 | Crawford |
| 2004/0047599 A1 | 3/2004 | Grzeczkowski |
| 2004/0060063 A1 | 3/2004 | Russ et al. |
| 2004/0103280 A1 | 5/2004 | Balfanz et al. |
| 2004/0117831 A1 | 6/2004 | Ellis et al. |
| 2004/0148638 A1 | 7/2004 | Weisman et al. |
| 2004/0213557 A1 | 10/2004 | Krakirian et al. |
| 2004/0237100 A1 | 11/2004 | Pinder et al. |
| 2004/0266336 A1 | 12/2004 | Patsiokas et al. |
| 2004/0268410 A1 | 12/2004 | Barton et al. |
| 2005/0014463 A1 | 1/2005 | Shin |
| 2005/0021609 A1 | 1/2005 | Houghton et al. |
| 2005/0028208 A1 | 2/2005 | Ellis et al. |
| 2005/0031099 A1 | 2/2005 | Iggulden et al. |
| 2005/0055716 A1 | 3/2005 | Louie et al. |
| 2005/0108769 A1 | 5/2005 | Arnold et al. |
| 2005/0125528 A1 | 6/2005 | Burke et al. |
| 2005/0138654 A1 | 6/2005 | Minne |
| 2005/0144634 A1 | 6/2005 | Koo et al. |
| 2005/0160458 A1 | 7/2005 | Baumgartner |
| 2005/0165784 A1 | 7/2005 | Gomez et al. |
| 2005/0177853 A1 | 8/2005 | Williams et al. |
| 2005/0188402 A1 | 8/2005 | de Andrade et al. |
| 2005/0193425 A1 | 9/2005 | Sull et al. |
| 2005/0228806 A1 | 10/2005 | Haberman |
| 2005/0229212 A1 | 10/2005 | Kuether et al. |
| 2005/0235316 A1 | 10/2005 | Ahmad-Taylor |
| 2005/0240968 A1 | 10/2005 | Knudson et al. |
| 2005/0251558 A1 | 11/2005 | Zaki |
| 2005/0278760 A1 | 12/2005 | Dewar et al. |
| 2006/0031833 A1 | 2/2006 | Huang et al. |
| 2006/0031883 A1 | 2/2006 | Ellis et al. |
| 2006/0037043 A1 | 2/2006 | Kortum et al. |
| 2006/0037048 A1 | 2/2006 | DeYonker et al. |
| 2006/0041910 A1 | 2/2006 | Hatanaka et al. |
| 2006/0101496 A1 | 5/2006 | Syed |
| 2006/0107285 A1 | 5/2006 | Medvinsky |
| 2006/0143690 A1 | 6/2006 | Lin et al. |
| 2006/0156372 A1* | 7/2006 | Cansler et al. ................ 725/134 |
| 2006/0190963 A1 | 8/2006 | Wagner et al. |
| 2006/0195441 A1 | 8/2006 | Julia et al. |
| 2006/0212906 A1 | 9/2006 | Cantalini |
| 2006/0257123 A1 | 11/2006 | Horozov et al. |
| 2006/0271950 A1 | 11/2006 | Kim et al. |
| 2006/0271973 A1 | 11/2006 | Jerding et al. |
| 2006/0287916 A1 | 12/2006 | Starr et al. |
| 2007/0056042 A1 | 3/2007 | Qawami et al. |
| 2007/0061336 A1 | 3/2007 | Ramer et al. |
| 2007/0094690 A1* | 4/2007 | Rodriguez ............ G06F 3/0482 725/58 |
| 2007/0107016 A1 | 5/2007 | Angel et al. |
| 2007/0112772 A1 | 5/2007 | Morgan et al. |
| 2007/0118857 A1 | 5/2007 | Chen et al. |
| 2007/0124776 A1 | 5/2007 | Welk et al. |
| 2007/0124781 A1 | 5/2007 | Casey et al. |
| 2007/0174888 A1 | 7/2007 | Rubinstein |
| 2007/0199040 A1 | 8/2007 | Kates |
| 2007/0294254 A1 | 12/2007 | Yao |
| 2008/0066135 A1 | 3/2008 | Brodersen et al. |
| 2008/0075285 A1 | 3/2008 | Poli et al. |
| 2008/0077506 A1 | 3/2008 | Rampell et al. |
| 2008/0086456 A1 | 4/2008 | Rasanen et al. |
| 2008/0109306 A1 | 5/2008 | Maigret et al. |
| 2008/0148322 A1 | 6/2008 | Howcroft |
| 2008/0155600 A1* | 6/2008 | Klappert et al. ................ 725/44 |
| 2008/0155607 A1 | 6/2008 | Klappert |
| 2008/0163307 A1 | 7/2008 | Coburn et al. |
| 2008/0168516 A1 | 7/2008 | Flick et al. |
| 2008/0192820 A1 | 8/2008 | Brooks et al. |
| 2008/0195664 A1 | 8/2008 | Maharajh et al. |
| 2008/0242221 A1 | 10/2008 | Shapiro et al. |
| 2008/0263600 A1 | 10/2008 | Olague et al. |
| 2008/0276284 A1 | 11/2008 | Bumgardner et al. |

(56) References Cited

U.S. PATENT DOCUMENTS

| | | |
|---|---|---|
| 2009/0013034 A1 | 1/2009 | Cheng et al. |
| 2009/0028087 A1 | 1/2009 | Nguyen et al. |
| 2009/0028331 A1 | 1/2009 | Millar et al. |
| 2009/0037961 A1 | 2/2009 | Green et al. |
| 2009/0043984 A1 | 2/2009 | Chang et al. |
| 2009/0077096 A1 | 3/2009 | Ohama et al. |
| 2009/0099858 A1 | 4/2009 | Jeffs |
| 2009/0199230 A1 | 8/2009 | Kumar et al. |
| 2009/0240912 A1 | 9/2009 | Wakrat et al. |
| 2009/0320084 A1 | 12/2009 | Azam et al. |
| 2010/0030814 A1 | 2/2010 | Wong et al. |
| 2010/0063877 A1 | 3/2010 | Soroca et al. |
| 2010/0162324 A1 | 6/2010 | Mehta et al. |
| 2010/0205397 A1 | 8/2010 | Chellam |
| 2010/0250892 A1 | 9/2010 | Logan et al. |
| 2011/0202269 A1 | 8/2011 | Reventlow |

FOREIGN PATENT DOCUMENTS

| | | |
|---|---|---|
| JP | 2004080194 | 3/2004 |
| WO | 92/11713 A1 | 7/1992 |
| WO | 02/069636 A1 | 9/2002 |
| WO | 2004064296 A | 7/2004 |
| WO | 2005/081523 A1 | 9/2005 |
| WO | 2005081523 A1 | 9/2005 |
| WO | 2006104968 A | 10/2006 |
| WO | 2007086941 A1 | 8/2007 |
| WO | 2007132165 A1 | 11/2007 |
| WO | 2008/016611 A2 | 2/2008 |

OTHER PUBLICATIONS

International Search Report and Written Opinion dated Feb. 9, 2009 in International Application No. PCT/US2008/070911 filed Jul. 23, 2008 by Alistair E. Jeffs et al.
Non-final Office action dated Dec. 22, 2010 in U.S. Appl. No. 11/828,622, filed Jul. 26, 2007 by Alistair E. Jeffs et al.
Final Rejection dated Jun. 14, 2010 in U.S. Appl. No. 11/828,622, filed Jul. 26, 2007 by Alistair E. Jeffs et al.
Non-final Office action dated Dec. 23, 2009 in U.S. Appl. No. 11/828,622, filed Jul. 26, 2007 by Alistair E. Jeffs et al.
Final Rejection dated May 5, 2011 in U.S. Appl. No. 11/828,622, filed Jul. 26, 2007 by Alistair E. Jeffs et al.

* cited by examiner

METHOD AND SYSTEM FOR PREORDERING CONTENT IN A USER DEVICE ASSOCIATED WITH A CONTENT PROCESSING SYSTEM

TECHNICAL FIELD

The present disclosure relates to a content processing and delivery system and, more specifically, to a system for controlling a user device to allow pre-ordering of content.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users.

SUMMARY

The present disclosure allows users to select content that is not yet available for later transfer to the user device.

In one aspect of the disclosure, a method includes receiving program guide data for linear channels at a user device, receiving future available content data at the user device, storing the program guide data in the user device, storing the future available content data in a memory of the user device, forming a future content selection, storing the future content selection in a queue until a predetermined time, after the predetermined time, communication a material identification to a content processing system, communicating the content corresponding to the material identification to the user device.

In a further aspect of the disclosure, a system includes a content processing system and a user device in communication with the content processing system. The content processing system receives program guide data for linear channels and receives future available content data at the user device. The future available content date comprises an availability window having an availability start time and an availability end time. The user device stores the program guide data in the user device storing the future available content data in a memory of the user device, forms a future content selection, and stores the future content selection in a queue until the availability window is reached. When within the availability window, the user device communicates a material identification to the content processing system. The content processing system communicates the content corresponding to the material identification to the user device.

In a further aspect of the disclosure, a method includes receiving program guide data for linear channels at a user device, receiving future available content data at the user device, wherein the future available content date comprises an availability window having an availability start time and an availability end time, storing the program guide data in the user device, storing the future available content data in a memory of the user device, forming a future content selection, storing the future content selection in a queue until the availability window is reached, within the availability window, communicating a material identification to a content processing system and communicating the content corresponding to the material identification to the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
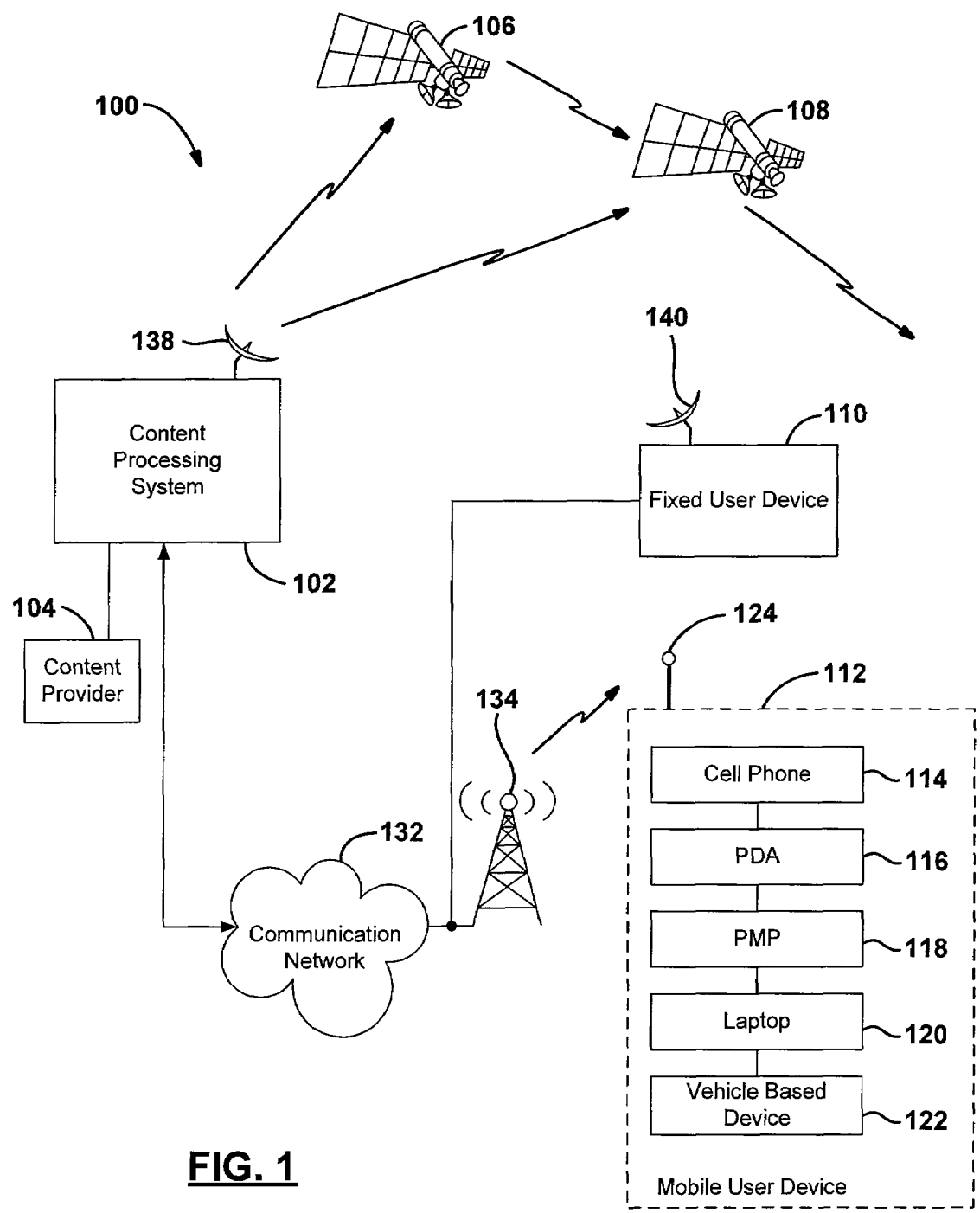
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a terrestrial system such as cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs) or set-top box. Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106,108, one or more of which may be a geosynchronous or geo-stationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
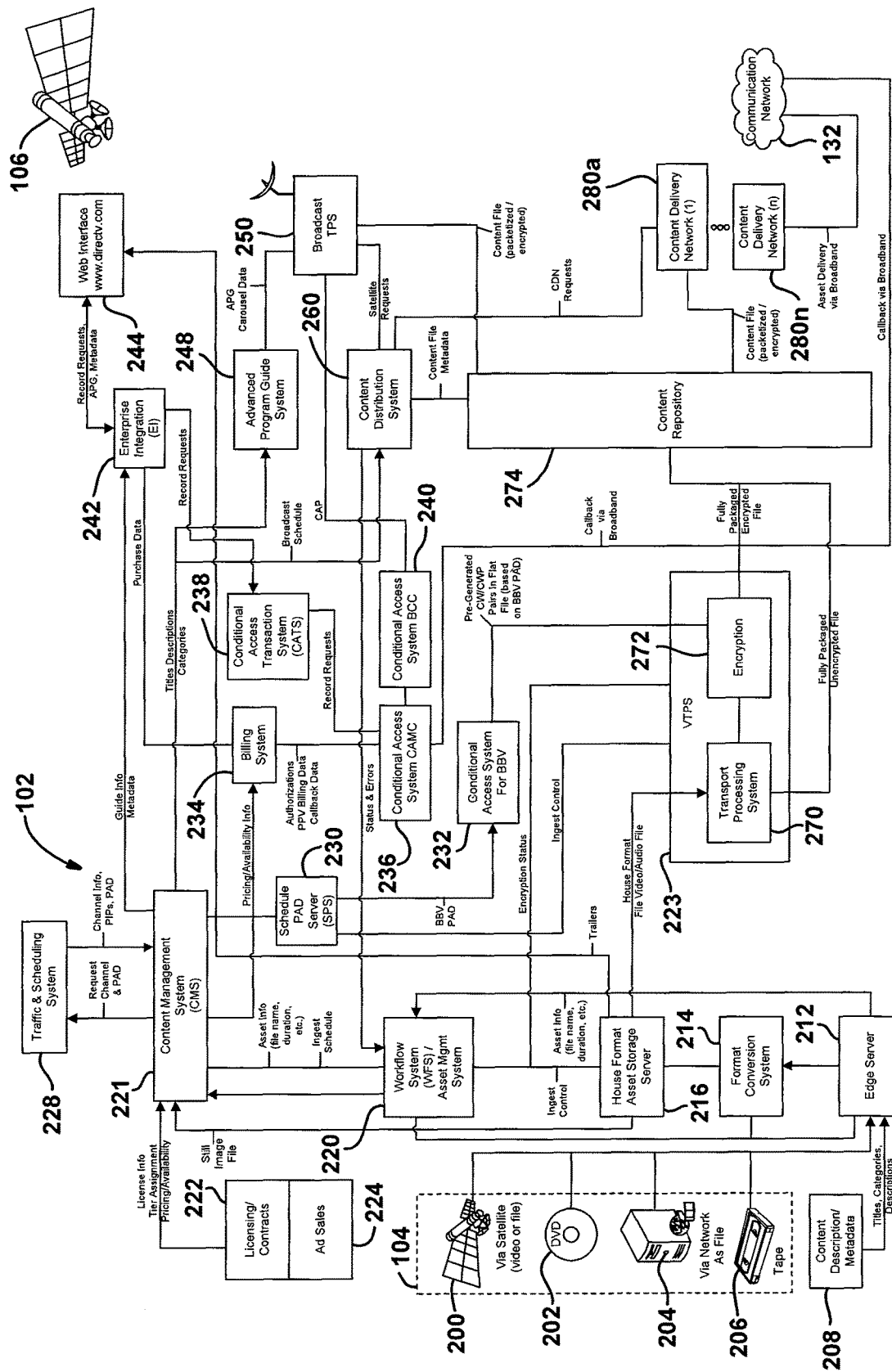
FIG. 2 is a detailed block diagrammatic view of the content processing system of FIG. 2.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide graphics, content description, and other metadata 208 to the system.

The content providers 104 may be various types of content providers and provide various types of content including advertising content such as row advertising (ads) is further described below. The content providers may provide various types of information including advertising information. Advertising providers may provide information on various products or various available or future content. It should be noted that the advertising provider and the content provider may be one in the same.

Information as to row ads may be provided by a content provider or an advertising provider. The row ads are ads that form a row or can take up a row or partial row in the program guide. Information received from the various providers may include various types of metadata, graphics, and the like. The metadata may also include location data as to where the row ad may fit as well as links to posters, asset or material identifications and various other links. Links provide a path to various other information. Links may also cause an action to be performed, such as tuning to a particular channel. The specifics of this will be described below.

The row ad metadata may include provider information that includes an identifier for identifying the content provided from the provider. A product identifier may also be included in the row ad metadata. An asset name stream may also be used to identify the asset. Major version numbers and minor version numbers may also be provided for the row ad content. A short description of the content may also be provided in the metadata. The creation date identifying the creation date of the content or row ad may also be provided in the metadata. A provider ID may also be formed. The provider ID may be various types of identification, including an internet domain name. An asset ID may be provided by the provider to identify the asset. A unique portable or material identification of the asset may be a combination of the provider ID and the asset identification. The material ID will be further described below in reference to the content management system which uses the material identification for various assets, including row ads. An asset class may also be assigned to the system. A verb may also be formed in the metadata. Verbs may include commands such as empty string and delete.

A link type may also be provided in the metadata that is used to identify a title of the asset, a channel or a homepage to which the row ad will link. The link type will also be described further below.

A link asset ID may also be included in the metadata. The link asset ID identifies the link from the row ad to the asset ID of the title asset. If the link is to a channel or homepage, this metadata may not be included.

Rollover text metadata may also be included in the system. The rollover text may appear when the particular row ad is highlighted by the user device. This string may include a phrase or other textual communication.

A text-only ad field may also be included in the metadata. A text-only ad includes merely a string of characters to be displayed. A text-only ad font may be used to change the font of the text-only ad. Various types of fonts, such as those commonly available in word processors, may be used. This may give the row ad a different look than the remaining portions of the program guide.

Content providers may also have a homepage within the present system. Briefly, the homepage is a portion of the program guide for selecting content to be downloaded to the user device. The system operator may also have its own homepage that has various categories of content. The categories and types of homepages will be described below.

The homepage may be formed in various configurations including a menu structure. The content providers may also provide various metadata for the menu structure or program guide.

Each provider may also have a homepage within the system from which a user device may be used to select and navigate through the menu. Ultimately, a selection may be made and communicated from the user device back to the content provider, whereby the content provider provides the content to the user device. Metadata used for identification may also be provided relative to the homepage. The provider, product, asset name, version major, version minor, description, creation date, provider ID, asset ID, asset class and verb, as described above with respect to the row ad, may also be provided in the homepage metadata. In addition, a homepage construction type may be provided in the metadata. The homepage construction type may be used to identify how or where the information is stored. For example, the home construction type may use the wording "complete" to refer to images of posters, background and other information. The string "background" may only provide a particular background scene upon which graphics and other data is placed. The background and various aspects of the homepage will be described below.

The metadata for the homepage may also include a home construct template that represents a template number that may be filled in by the various content providers. The operator of the content processing system may establish various homepage templates for which various information may be provided by the content providers to fill in the homepage. Various categories and the like may be filled in by the content providers within the various parameters of the various templates. This portion of the metadata may be used to identify the pre-made templates.

A poster art position metadata may also be provided by the content provider. Various poster positions, as will be described below, may be established by the content processing system. As will be described below, the posters may be used in a "complete." The poster position identifies the poster art position and may include a variable to identify the template number and a number to identify the template and a number to identify the poster position.

A poster art position tab text may identify a tab text associated with the poster art position. One number associated with this metadata may include the template number and another number may identify the poster position. The value may be a string that is displayed at a certain position somewhere around or underneath the poster.

A promotional (promo) area title may also be included in the metadata. The promotion area title may specify the title to be shown in the promo area of the homepage. The promotional area may be an area defined within the template. This may also be set forth only in a complete.

The promotional area body may provide certain amount of characters or lines below the title in the promotional area of the homepage. There may be one or several promotional areas within a homepage.

A display start and a display end metadata field may also be provided. This may provide a start time and end time for displaying the fields. The start time and end time may correspond to the local time of the particular user device. That is, based upon the display start time and display end time and the local clock, the display may be changed accordingly.

Another area of the content processing system 102 is an input server 212 that receives the various content and converts the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packet. The encoder may encode the data according to the CableLabs® Video-on-Demand (VoD) encoding specification MD-SP-VOD-CEP-I01-040107 (i.e., performs asset encoding). The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier (ID) in the metadata as well as the provider ID. Content, posters and other received information may be assigned related material identifications to make them easier to associate and retrieve. For example, different suffixes may be used to identify related content with the remainder of the material identification being the same.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A traffic and scheduling system 228 is used to provide the requested channel, program associated data (PAD), channel information and program information packets (PIPs). The traffic and scheduling system 228 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the workflow system and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate record requests to the conditional access transaction system 238. Record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description, various categories and metadata from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Titles, descriptions and categories may also be provided from the content management system 221 to the content distribution system 260. Content files and metadata may be controlled by the content distribution system 260.

Referring back to the video transport processing system 227, the video transport processing system 223 includes a transport packaging system 270. The transport packaging system 270 creates pre-packetized unencrypted files that are stored in the content repository 274. An encryption module 272 receives the output of the transport packaging system and encrypts the packets. Fully packaged and encrypted files may also be stored in the content repository 274. Encryption may take place in the data portion of a packet and not the header portion.

One or more content delivery networks 280*a-n* may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

Security of assets available by way of the content delivery network may also be established. Control word packets for each broadcast-encrypted asset or content file may be provided to the content delivery network. Encryption may also be provided.

The broadcast transport processing system 250 may provide various functions, including encoding, packetizing, encrypting, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or assets asset files, menus structures etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

Figure 3:
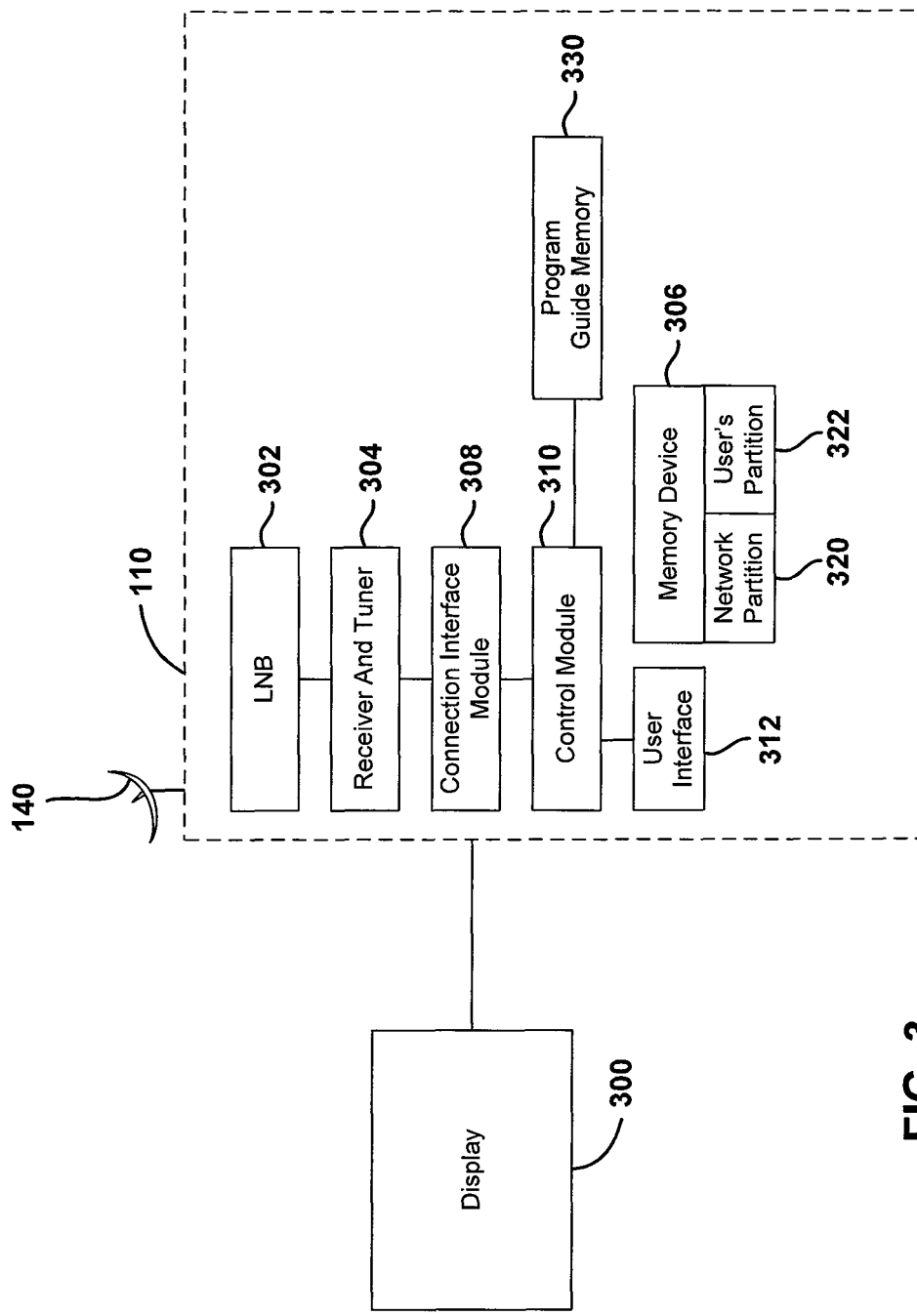
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a memory device 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of or combination of storage devices such as a hard disk drive, DVR, flash memory or other types of memory devices. The memory device 306 may be used to store the content, information, metadata, program guide objects and information and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

A program guide memory 330 may also be included in the device. The program guide memory 330 may be used to store program guide information and homepage information for the linear and virtual channels. The program guide memory 330 may be implemented as a non-volatile memory such as flash memory. The program guide memory 330 may thus be a separate memory device. Memory device 330 may also be integral with recording device 306.

Figure 4:
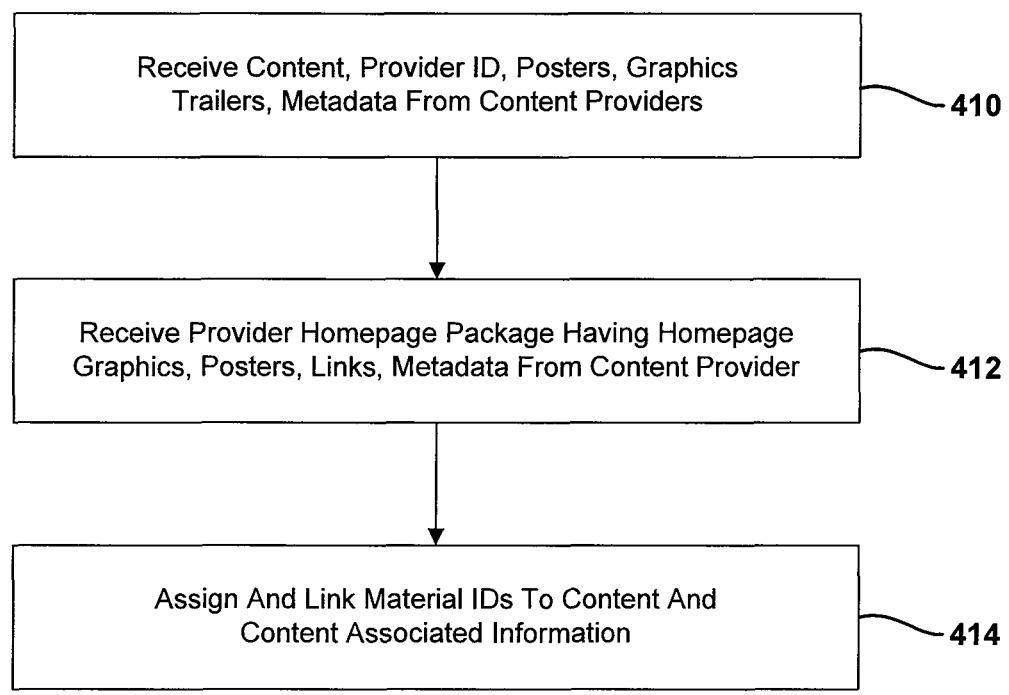
FIG. 4 is a flowchart illustrating a method for linking content and content-associated information.

Referring now to FIG. 4, a method of assigning material identifications to various content and content-associated information is set forth. In step 410, content is received from various content providers. The providers may provide a provider or asset identification (ID) for the content provided. Posters, trailers, graphics, metadata may also be received from content providers. The content and the other content-associated information may be received in different ways or the same way. When received in different ways, they may be associated together in the content processing system. In step 412, the content providers may also provide a homepage package having the homepage graphics, posters, links and metadata from the content provider. The types of metadata that may be received from the content providers was described above in FIG. 1.

In step 414, the material identification is assigned to the content and to the content-associated information. This step may be performed in the content management system of FIG. 2. Preferably the material ID and the associated content information are linked together. As mentioned above, one way to link the content with the content-associated information is to provide a common material identification with various suffixes to identify the various information.

Figure 5:
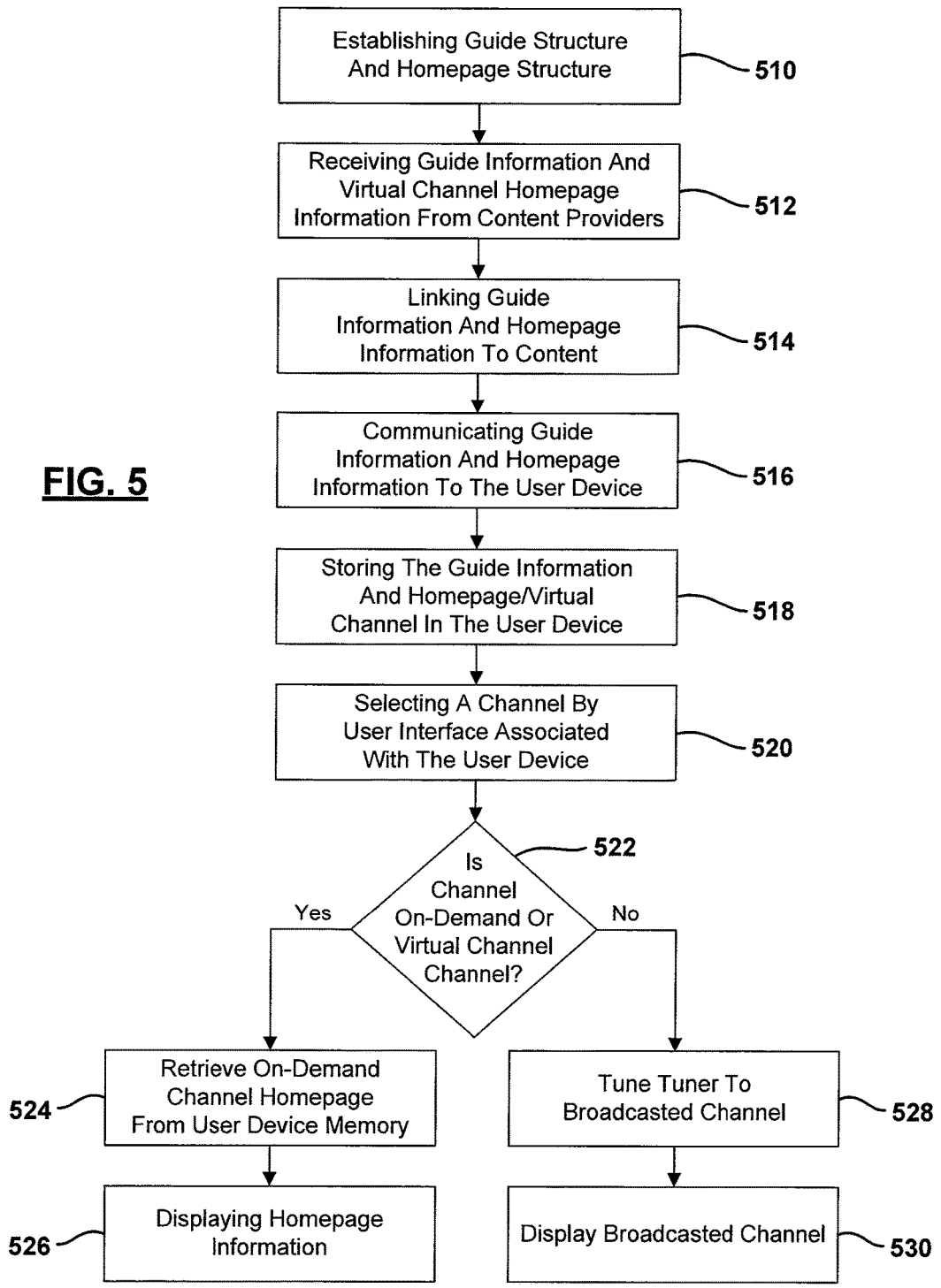
FIG. 5 is a flowchart of a method for selecting channels from a user device.

Referring now to FIG. 5, the data or information received by the user device may be used to populate a guide or menu structure. In step 510, the content processing system establishes various guide structures and homepage structures. These may be referred to as templates. The templates may correspond to the physical layout of the screen display on the user device. Virtual channels have homepages that have content to order in an on-demand or request-based manner. Linear channels, in contrast, are normally broadcast network channels that communicate on program or content after another in real time. Virtual channels may also be associated with a network but are not real time. Content is communicated to the user device only when requested.

In step 512, the guide information and virtual channel or homepage data is received from content providers. The guide information or homepage data may be received in various manners as described above. In step 514, the guide information and homepage information or data is linked to the content. The material identification may be used in the linking. In step 516, the guide information is communicated to the user device. The guide or homepage data may be communicated using separate or the same communication means. The guide information and homepage information may be communicated in various ways, including through the terrestrial system, broadband communication system, satellite or the like. The guide information may also be referred to as objects. The guide information and homepage may be program guide information or separate menus that are reachable from the program guide information. Guide information and homepage information may be continuously broadcast at various times throughout the day so that the guide information may be updated. The guide information may be stored in the memory of the user device and displayed on request.

In step 518, the guide information and homepage information are displayed in the associated structure using the associate template. The guide information or homepage information may also be in the form of a menu structure that also uses various templates. The content information may also include the metadata as described above. The metadata may provide various ratings and the like for the particular content. A material identification may be associated with various selections in the program guide or virtual channel homepage.

In step 520, a selection of a channel is performed using a user interface associated with the user device. The user interface may be a remote control in communication with the user device or push buttons on the user device. It is also possible that a graphical user interface may be used for selecting a channel. Selections may be made in response to the program guide structure or menu structure.

In step 522, if the channel is an on-demand or virtual channel step 524 is performed. In step 524, the on-demand or virtual channel homepage is received from the user device memory. In step 526, the homepage or virtual channel information is displayed.

Referring back to step 522, if the channel is not an on-demand or virtual channel, step 528 is performed. In step 528, the tuner is tuned to the broadcasted linear channel. In step 530, the broadcasted or linear channel is displayed in association with the user device. The user device is a hand-held device whose channel may be displayed on the user device. If the user device is a satellite television set top box, the user device may be coupled to a separate display such as a television.

Figure 6:
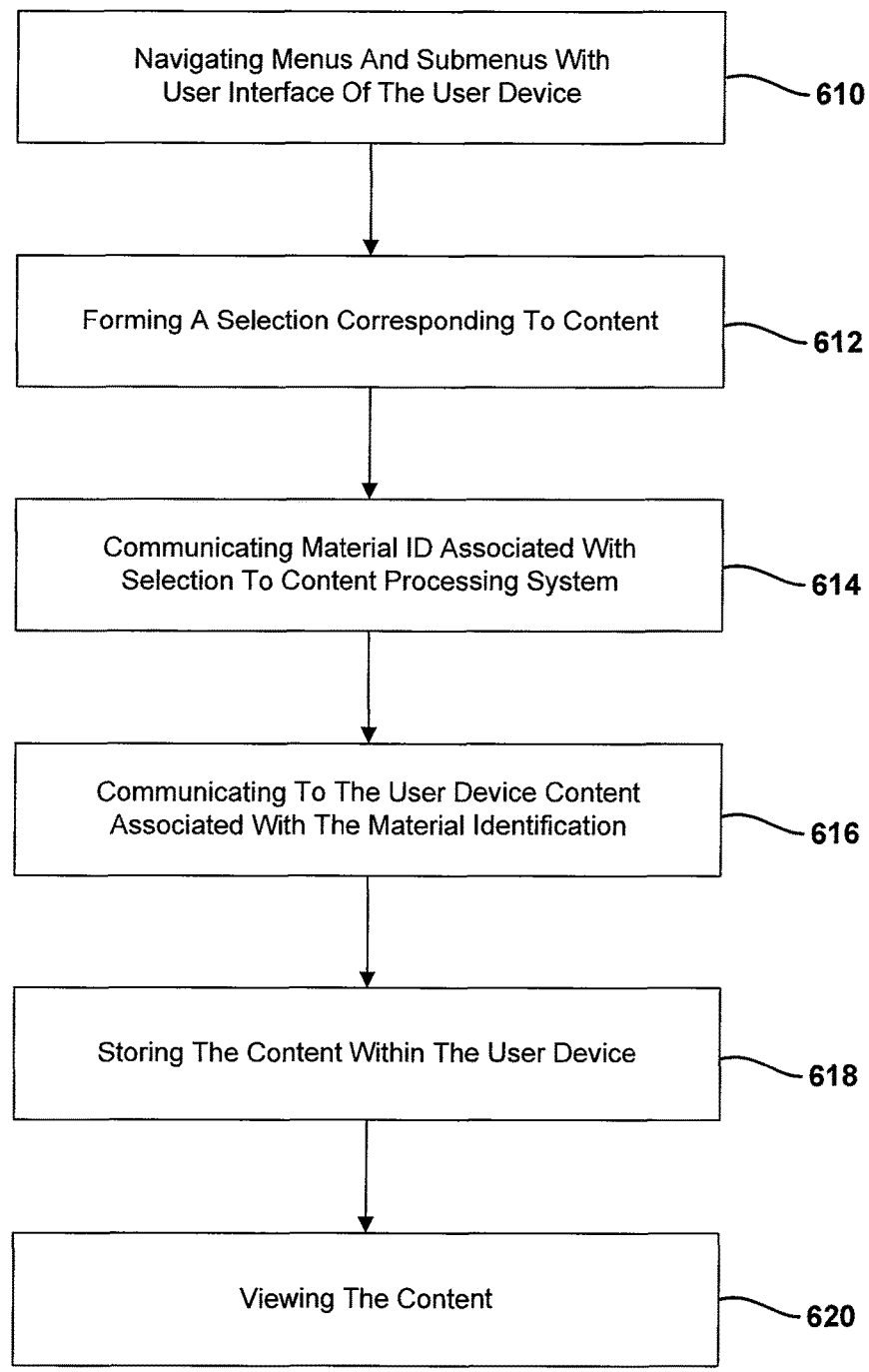
FIG. 6 is a flowchart of a method for selecting content from a user device.

Referring now to FIG. 6, from the user device the various menus, sub-menus and program guide may be navigated in step 610 using the user interface illustrated in FIG. 3. In step 612, once a particular menu with a particular content selection is reached, a selection may be formed that corresponds to content. The selection may select a material identification (ID) that is received with the metadata. In step 614, the material ID associated with the selection is communicated to the content processing system. The communication may take place using a terrestrial system such as a broadband system, a wireless broadband system, or other types of communication systems described above.

In step 616, the content associated with the material identification, is communicated to the user device. In step 618, the content may be stored within the user device. This step may also be an optional step. In step 620, the content may be viewed from the memory device or directly as the content is received. It is envisioned that a commercial embodiment will store the content as it is received. It is also envisioned that the content may be stored while the content is being played from the beginning of the content file.

Figure 7:
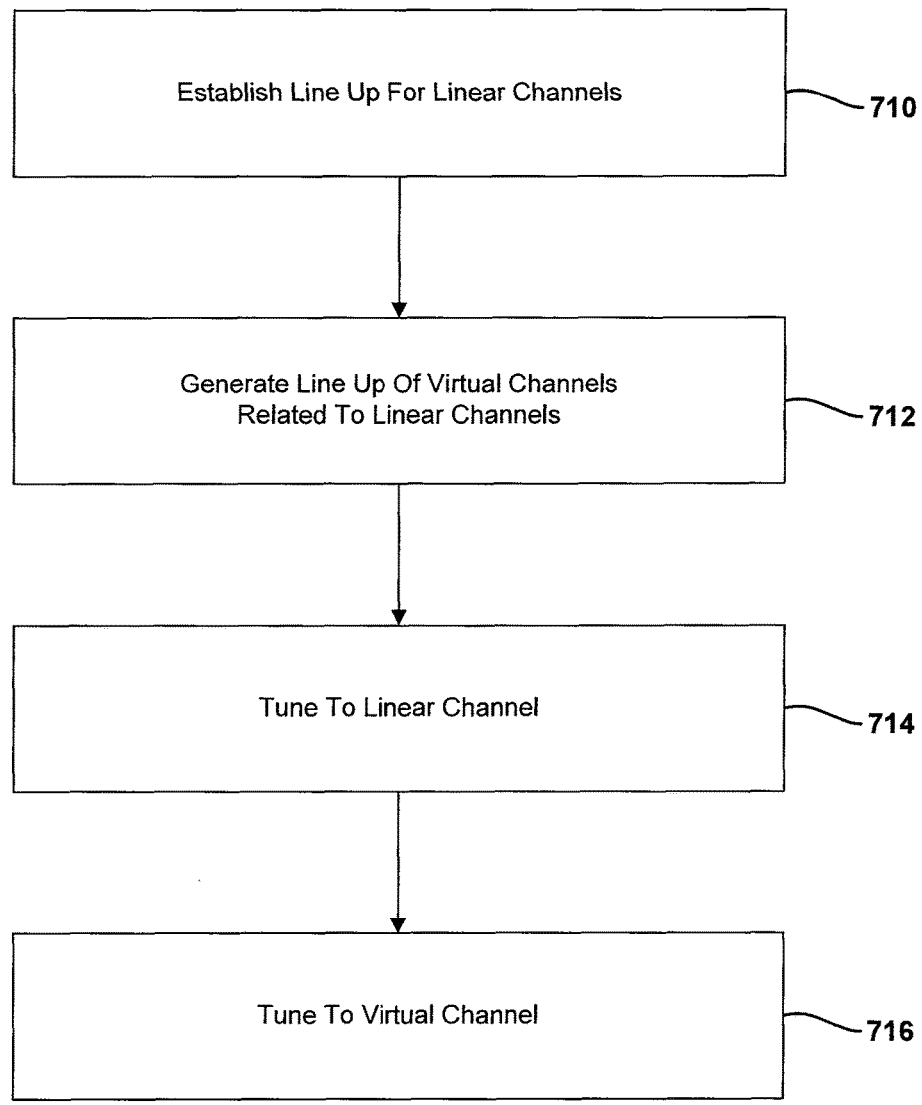
FIG. 7 is a method for tuning channels from a user device.

Referring now to FIG. 7, a method for coordinating the linear channels and the virtual channels is set forth. The coordination may take place in the content processing system. In step 710, a line-up for the linear channels is determined. Various channels will have various numerical identifiers associated therewith to form the line-up. In step 712, a line-up of virtual channels is generated that are related in a predetermined manner to the linear channels. The linear channels may be associated with various networks. The virtual channels may also be associated with various networks. The virtual channels may be related to the linear channels by a predetermined factor such as 1,000. The linear channels may be tuned by adding the predetermined factor such as 1,000 to the linear channels. For example, if HBO is channel 200, channel 1,200 will be HBO's virtual channel or on-demand channel. This will allow the user to conveniently tune to the on-demand channel since users typically memorize the linear channels and, in particular, their favorite linear channels.

In step 714, the linear channel may be tuned using a remote control or other user interface. In step 716, the virtual channel may be tuned by increasing the linear channel by a predetermined factor such as 1,000. The numerical channel may be tuned using the user interface associated with the user device.

Figure 8:
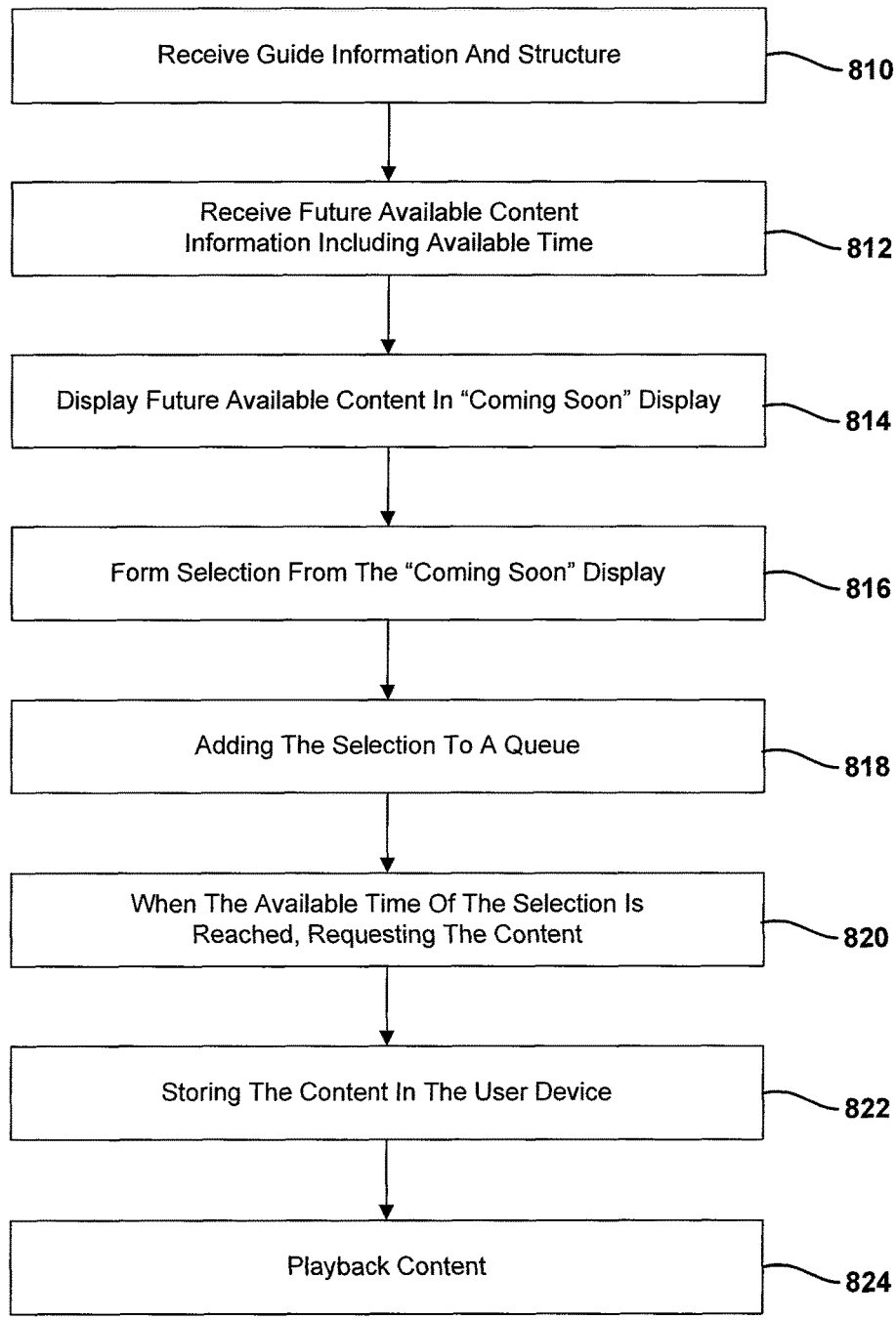
FIG. 8 is a method for preordering content at a user device.

Referring now to FIG. 8, a method of pre-selecting content is set forth. In step 810, the guide information and structure is received at the user device. As mentioned above, the user device may include many devices and the method or means for communicating the information may include various types of means.

In step 812, the future available content information or data is received. The future available content may also include associated data such as the available time or time window. An announcement time prior to the available time may set the time after which the particular content may be displayed. The time window may be a time when the content will first become available for download to the user device. An end time may be also associated with the device for the time when the content is no longer available.

In step 814, the future available content may be displayed on a separate or "Coming Soon" homepage or virtual channel. The display may take the form of various templates as described above.

A selection may be formed from the Coming Soon homepage display in step 816. The selection may be formed in the same ways that a channel may be formed such as using the user interface such as the remote control or push buttons.

In step 818, after a selection is formed, the selection is added to a queue, since the content is not yet available for downloading from the content processing system. In step 820, when the available time of the selection is reached, the content is requested from the content processing system. The request may be formed through a broadband communication network or the like. Telephone lines, or the like, may also be used for communicating the request.

The requested content is retrieved from the content processing system and delivered from a content delivery network in the memory of the user device. As mentioned above, the user device may include a digital video recorder.

In step 824, the content may be played back through the user device. The content may be played back after some or all of the content has been received from the content processing system. The digital video recorder may also act as a buffer so that once enough content has been received the playback of the content may be uninterrupted and, thus, not reach the end of the partially-downloaded content.

It should be noted that "Coming Soon" content may be displayed together with currently available content.

Figure 9:
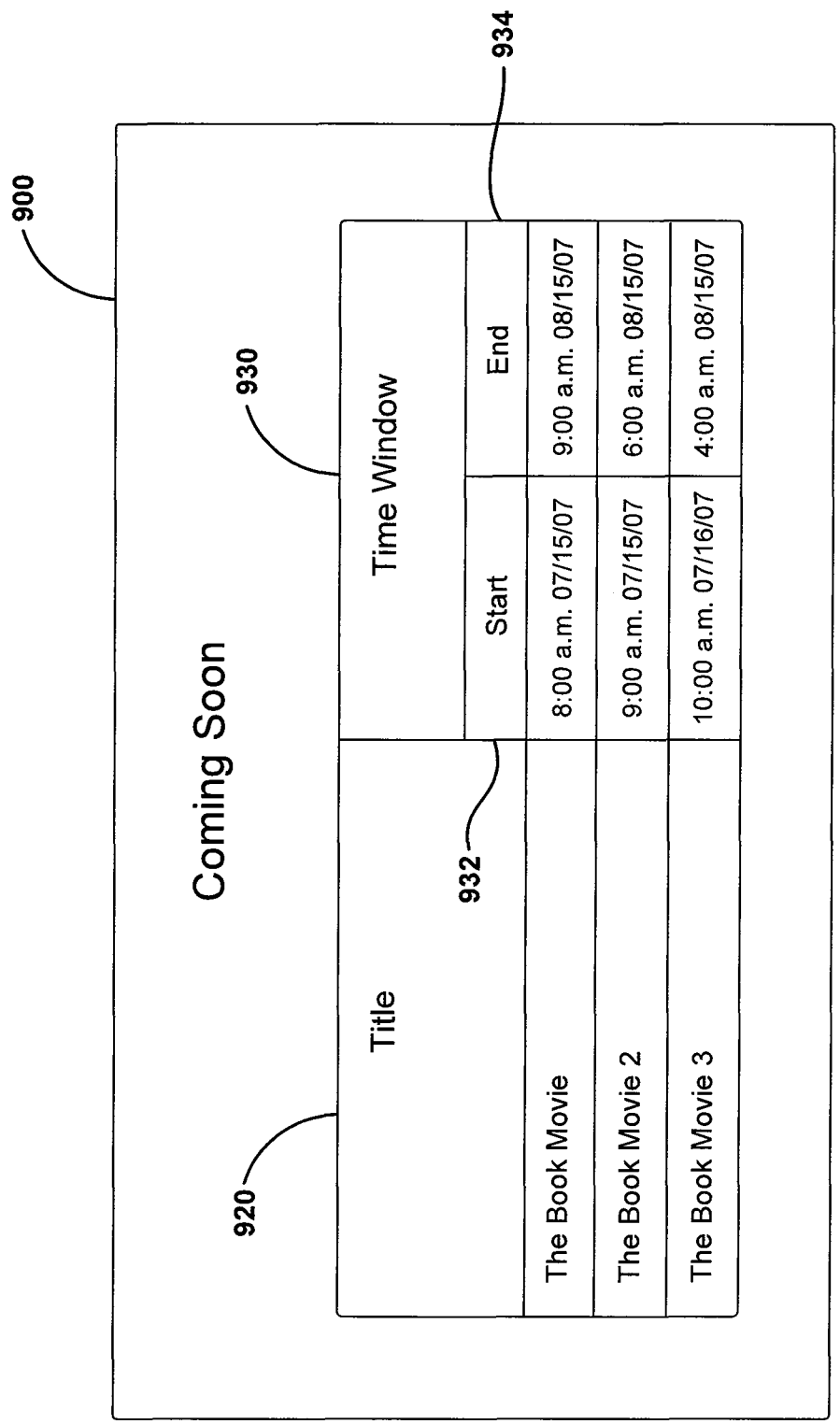
FIG. 9 is a screen display for preordering content.

Referring now to FIG. 9, a screen display 900 illustrating a "Coming Soon" homepage is set forth. As mentioned above, the Coming Soon content display may be incorporated into a regular display or homepage. In this example, three different example titles are illustrated in the title area 920. Various titles and numbers of titles may be available at any one time. In a constructed system, the titles may rotate and become refreshed when new titles are added. The titles, as illustrated for this example, include "The Book Movie," "The Book Movie 2" and "The Book Movie 3." A time window area 930 is also set forth that includes a start time 932 and an end time 934. Each of the titles may have different or similar start times and end times. The start time is the time the content is available for downloading. Before the start time, the content may not be requested from the content processing system. After the end time, the content can no longer be requested from the content processing system.

Figure 10:
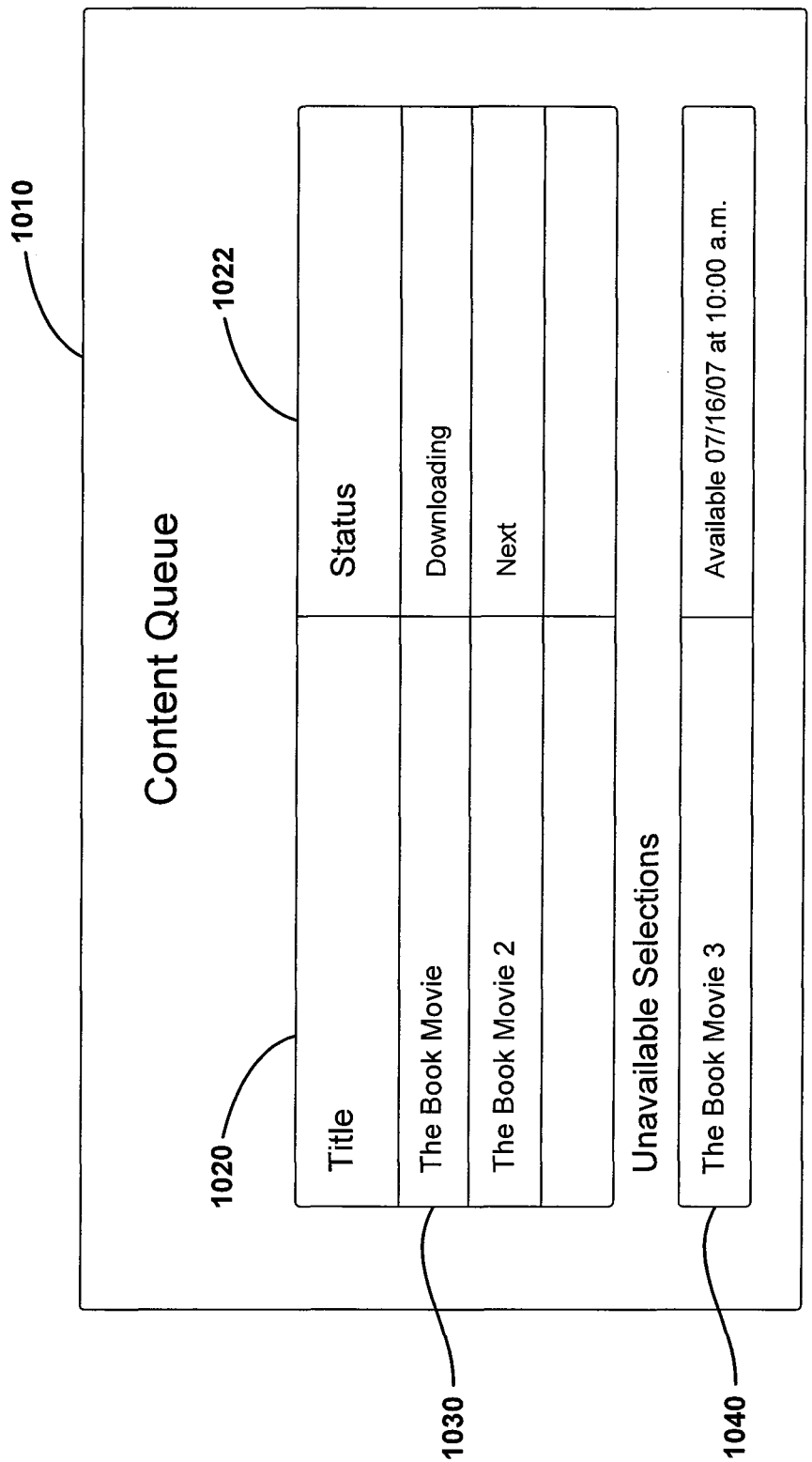
FIG. 10 is a screen display of a content queue.

Referring now to FIG. 10, a content queue display 1010 is illustrated. The content queue 1010 includes a title portion 1020 and a status portion 1022. Together the title portion and the status portion form the queue 1030. In this example, the queue includes The Book Movie and The Book Movie 2. The Book Movie 2 will begin to be downloaded after The Book Movie is downloaded. An unavailable selection portion 1040 is also set forth. The unavailable selection portion includes the Book Movie 3 whose status is unavailable but the status illustrates the time and date when the Book Movie 3 becomes available. When the content becomes available, the content is added or moved to the content queue 1030 for downloading an order. It is also possible to set a priority so that once the particular unavailable selection becomes available within the time window, the priority of the content is increased to allow the content to move to the top of the content queue. It should also be noted that selections in the unavailable selection may be removed to prevent downloading in the event the content is no longer desired.

It should be noted that future available content may ultimately be selected and communicated in similar manners to those described above. For example, a broadband communication network may be used for communicating the program guide data and the future available content data. The satellite may also be used to communicate the future available content data and the program guide data. It should also be noted that different communication means may be used for communicating the program guide data and the future available content data. The coming soon and content queues may be available on a mobile satellite television unit, a fixed user device such as a satellite television set top box or a cable TV set top box.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
receiving program guide data for linear channels at a user device;
receiving future available non-linear content data at the user device corresponding to future available non-linear content, said program guide data different than the future available non-linear content data, wherein the future available non-linear content data comprises an availability window having an availability start time and an availability end time, wherein the future available non-linear content is not broadcasted at a predetermined time, said future available non-linear content data being available after an announcement time and prior to the availability start time;
storing the program guide data in the user device;
displaying the program guide data in a first screen display;
storing the future available non-linear content data in a memory of the user device;
displaying future available non-linear content data in a second screen display different than the first screen display after the announcement time prior to an availability start time;
thereafter, forming a future available non-linear content selection;
thereafter, storing the future available non-linear content selection in a queue in the user device until the availability window is reached;
between the availability start time and the availability end time, communicating a material identification of the future available non-linear content selection to a content processing system in response to the availability start time;
communicating the future available content corresponding to the material identification to the user device;
storing the future available content in the user device; and
indicating the future available content as available in a third screen display separate from the first screen display after or during storing.

2. A method as recited in claim 1 wherein receiving the program guide data comprises receiving the program guide data from a satellite.

3. A method as recited in claim 1 wherein receiving the future available non-linear content data comprises receiving homepage data from a satellite.

4. A method as recited in claim 1 wherein receiving the program guide data comprises receiving the program guide data from a broadband communication network.

5. A method as recited in claim 1 wherein receiving the future available non-linear content data comprises receiving the future available content data from a broadband communication network.

6. A method as recited in claim 1 wherein receiving the program guide data comprises receiving the program guide data at a satellite television receiving unit.

7. A method as recited in claim 1 wherein receiving the program guide data comprises receiving the program guide data at a mobile satellite television receiving unit.

8. A method as recited in claim 1 wherein receiving the program guide data comprises receiving the program guide data at a mobile user device.

9. A method as recited in claim 1 wherein receiving the program guide data comprises receiving the program guide data at a fixed user device.

10. A system comprising:
a content processing system;
a user device in communication with the content processing system receiving program guide data for linear channels, receiving future available non-linear content data at the user device corresponding to future available non-linear content, said program guide data different than the future available non-linear content data, wherein the future available non-linear content data comprises an availability window having an availability start time and an availability end time, wherein the future available non-linear content is not broadcasted at a predetermined time, said future available non-linear content data being available after an announcement time prior to the availability start time, said user device storing the program guide data, displaying the program guide data in a first screen display, storing the future available non-linear content data in a memory of the user device, displaying future available non-linear content data in a second screen display different than the first screen display after the announcement time prior to the availability start time, thereafter, forming a future available non-linear content selection, thereafter, storing the future available non-linear content selection in a queue until the availability window is reached, between the availability start time and the availability end time, communicating a material identification of the future non-linear content selection to the content processing system in response to the availability start time;
said content processing system communicating the future available non-linear content corresponding to the material identification to the user device;
storing the future available non-linear content in the user device; and
said user device indicating the future available non-linear content as available in a third screen display separate from the first screen display after or during storing.

11. A system as recited in claim 10 further comprising a satellite in communication with the user device and the content processing system wherein the satellite communicates the program guide data from the content processing system to the user device.

12. A system as recited in claim 10 further comprising a satellite in communication with the user device and the content processing system wherein the satellite communicates homepage data from the content processing system to the user device.

13. A system as recited in claim 10 further comprising a broadband communication network in communication with the user device and the content processing system wherein the broadband communication network communicates the program guide data from the content processing system to the user device.

14. A system as recited in claim 10 further comprising a broadband communication network in communication with the user device and the content processing system wherein the broadband communication network communicates the future available content data from the content processing system to the user device.

15. A system as recited in claim 10 wherein the user device comprises a satellite television receiving unit.

16. A system as recited in claim 10 wherein the user device comprises a mobile satellite television receiving unit.

17. A system as recited in claim 10 wherein the user device comprises a mobile user device.

18. A system as recited in claim 10 wherein the user device comprises a fixed user device.

* * * * *